United States Patent [19]

Lipscomb

[11] Patent Number: 4,884,352
[45] Date of Patent: Dec. 5, 1989

[54] CHANGEABLE SIGN ASSEMBLY

[76] Inventor: Robert S. Lipscomb, 2306 Brook Hollow, Wichita Falls, Tex. 76308

[21] Appl. No.: 84,135

[22] Filed: Aug. 12, 1987

[51] Int. Cl.$^4$ ............................................. G09F 7/02
[52] U.S. Cl. ..................................... 40/611; 40/489; 40/650
[58] Field of Search .................... 40/489–491, 40/16, 16.2, 16.4, 611, 618, 124, 124.2, 124.4, 576; 292/345

[56] References Cited

U.S. PATENT DOCUMENTS

| | | | |
|---|---|---|---|
| 1,972,959 | 9/1934 | Taylor | 40/16.2 |
| 2,738,605 | 3/1956 | Johnson | 40/576 |
| 2,878,605 | 3/1959 | Johnson | 40/611 |
| 2,944,355 | 7/1960 | Parkinson | 40/611 |
| 3,174,239 | 3/1965 | Cramer | 40/16.2 |

FOREIGN PATENT DOCUMENTS 736911 12/1932 France .................... 40/611

Primary Examiner—Gene Mancene
Assistant Examiner—Michael Lynch
Attorney, Agent, or Firm—Kenneth R. Glaser

[57] ABSTRACT

A changeable sign assembly comprises a base, at least two retaining members attached to the base having walls defining opposing longitudinal grooves, and plurality of display members having curved opposite edge portions formed of a thin resilient material, the edge portions being flexibly deformed by the longitudinal grooves in the retaining members such that the display members are removably retained by the retaining members.

2 Claims, 2 Drawing Sheets

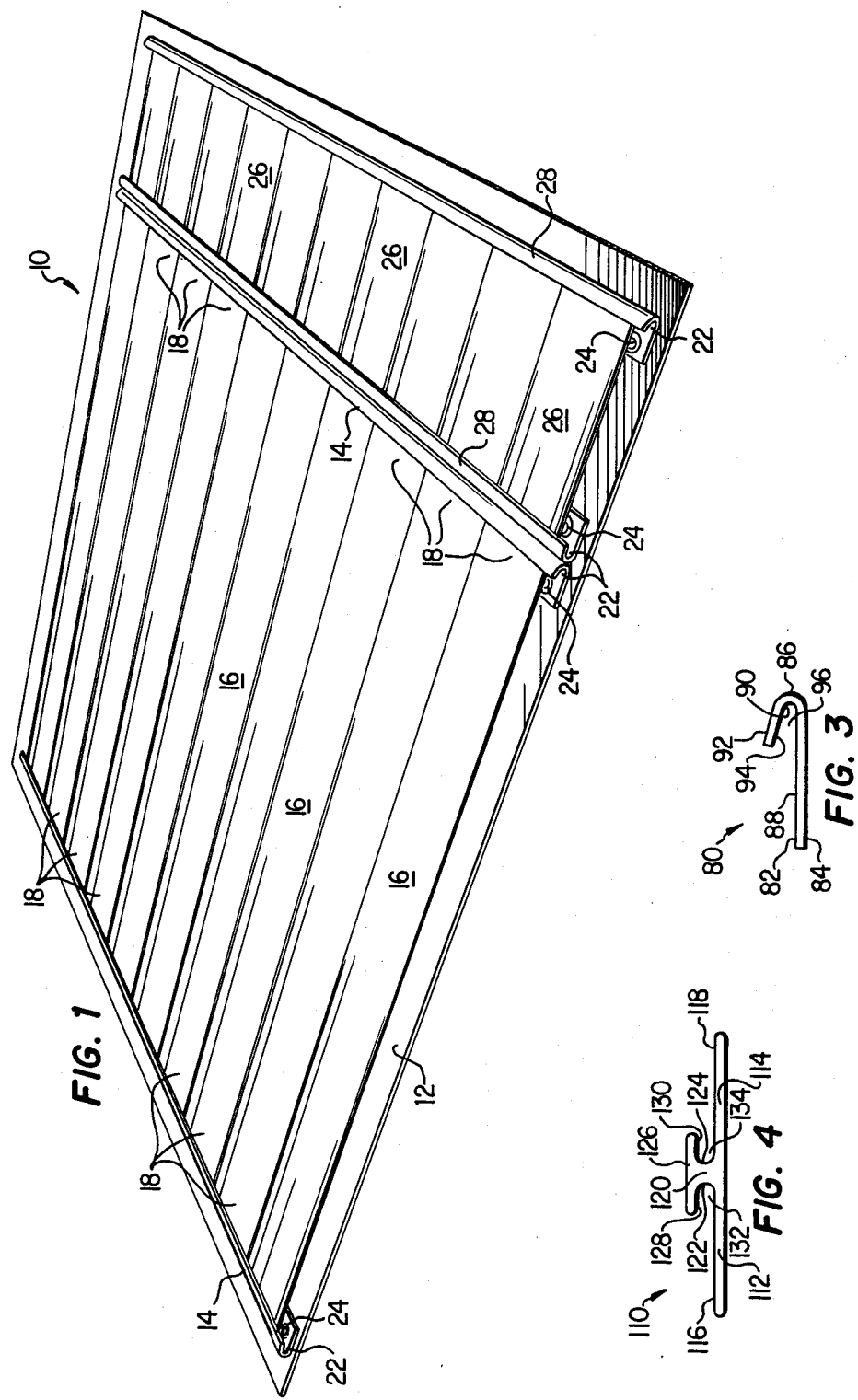

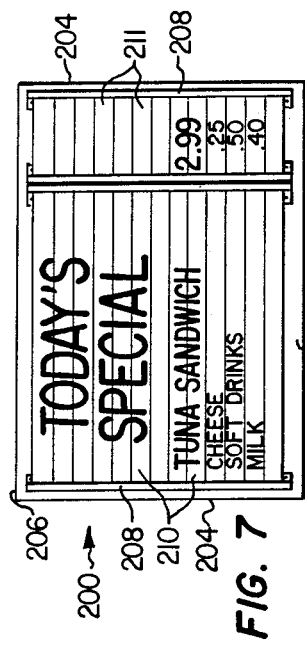
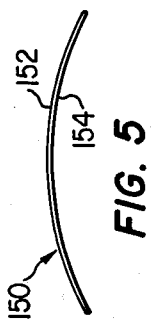
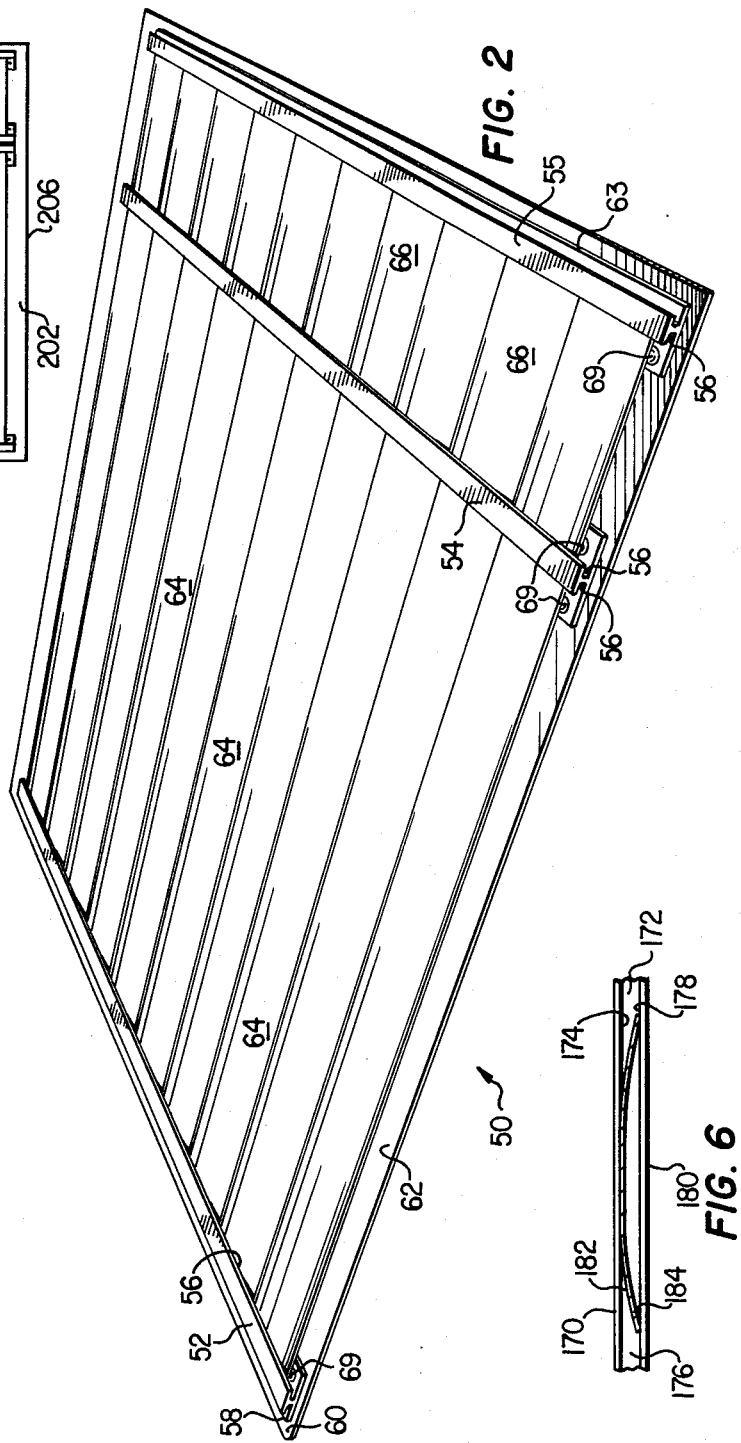
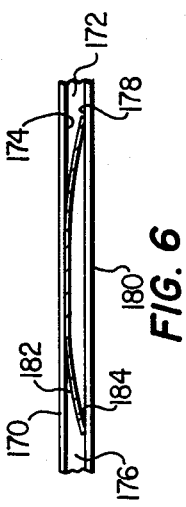

CHANGEABLE SIGN ASSEMBLY

FIELD OF THE INVENTION

The present invention relates to sign assemblies, and more particularly to changeable sign assemblies for use in menu boards and the like.

BACKGROUND OF THE INVENTION

Changeable sign assemblies have long been used in such applications as menu boards in restaurants. Such changeable sign assemblies typically include a planar base upon which individual letters are removably attached to display the desired information. Such prior sign assemblies are expensive and complicated to manufacture, due to the specialized hardware and materials needed to effect their construction.

SUMMARY OF THE INVENTION

The present invention provides a changeable sign assembly wherein a plurality of removable display members having curved opposite edge portions and formed of a thin resilient material are removably retained by a plurality of retaining members attached to a base. Each retaining member has a longitudinal groove in which the curved edge portions are flexibly deformed for frictional engagement. In the preferred embodiment, the display members are made from widely available miniature Venetian blind blade stock.

BRIEF DESCRIPTION OF THE DRAWINGS

A more complete understanding of the invention and its advantages will be apparent from the Detailed Description taken in conjunction with the Drawings in which:

FIG. 1 is a partial perspective view of a first embodiment of the invention;

FIG. 2 is a partial perspective view of a second embodiment of the invention;

FIG. 3 is an enlarged side view of a retaining member usable in connection with the assembly of FIG. 1;

FIG. 4 is an enlarged side view of a retaining member used with the assembly of FIG. 2;

FIG. 5 is an enlarged side view of a display member;

FIG. 6 is a partial sectional view of a display member and retaining member; and FIG. 7 is an illustration of the invention in use as a menu board.

DETAILED DESCRIPTION OF THE PREFERRED EMBODIMENT

Referring initially to FIG. 1, the changeable sign assembly 10 of the present invention includes a planar base 12 and at least two retaining members 14 attached to base 12. Display members 16 have curved opposite edge portions 18 formed of a thin resilient material. Retaining members 14 include walls defining longitudinal grooves 22. The edge portions 18 are flexibly deformed by the longitudinal grooves 22, such that display members 16 are removably retained by the retaining members. The retaining members are attached to base 12 by way of fasteners 24. A second row of display members 26 are similarly removably retained by retaining members 28.

Referring now to FIG. 2, an alternate embodiment of the invention provides a sign assembly 50 having retaining members 52, 54, and 55. Retaining members 52, 54, and 55 are formed of a widely available extruded aluminum moulding having walls defining opposing longitudinal grooves 56. Retaining member 52 preferably has edge 58 trimmed flush along edge 60 of base 62 to remove excess unused material therefrom. Retaining member 55 is similarly trimmed along edge 63. Display members 64 are similar to those described in connection with FIG. 1, and are removably retained by longitudinal grooves 56. A second row of display members 66 are removably retained by a second longitudinal groove 68 in retaining member 54. Rivets 69 attach the retaining members to the base 62.

It will be understood that a simpler changeable sign assembly can be made by having only two retaining members, at the extreme sides of the base, without departing from the scope of the invention. Similarly, any number of retaining members can be utilized to provide multiple side-by-side groups of display members.

Referring now to FIG. 3, retaining member 80 is usable with the embodiment of the invention described above in connection with FIG. 1. Retaining member 80 in the preferred embodiment is formed from a strip of aluminum which has been edge rolled to have the configuration shown in FIG. 3. The transverse sectional configuration of retaining member 80 is defined by a facing portion 82 having a first planar side 84 which contacts and is coplanar with the surface of base 12 (FIG. 1). A web portion 86 extends from a second planar side 88 of facing portion 82. Web portion 86 includes a curved concave side 90. Finally, retaining member 80 includes a wall portion 92 extending from web portion 86 and having a planar inner side 94. Second planar side 88, curved concave side 90 and planar inner side 92 define longitudinal groove 96 in each of the retaining members.

Referring now to FIG. 4, retaining member 110 is usable in connection with the embodiment of the invention described above in connection with FIG. 2. The transverse sectional configuration of retaining member 110 includes a planar facing portion 112 having a first planar side 114 in contact with and parallel to the base. Facing portion 112 also includes second and third planar sides 116 and 118 on opposite sides of facing member 112. Web portion 120 extends from second planar sides 116 and 118 and includes curved concave sides 122 and 124. Wall portion 126 includes planar inner sides 128 and 130. A first longitudinal groove 132 is formed by sides 116, 122 and 128, and a second longitudinal groove 134 is defined by sides 118, 124 and 130.

Referring now to FIG. 5, in preferred form display member 150 is a portion of a widely available miniature Venetian blind blade stock cut to the desired length. The preferred display element 150 is approximately one inch wide, but wider blades may also be used. Display member 150 includes an outer convex surface 152 and an inner concave surface 154.

Referring now to FIG. 6, retaining member 170 includes longitudinal groove 172 as described above with respect to either FIG. 3 or FIG. 4. Longitudinal groove 172 is formed by planar inner side 174, curved concave side 176 and second planar side 178 of facing portion 180. A curved end portion 182 of a display member 184 has been flexibly deformed by longitudinal groove 172, as shown, such that the display member 184 is removably retained by retaining member 170.

In operation, the changeable sign assembly of the present invention is usable, for example, as menu board 200 shown in FIG. 7. Menu board 200 includes a planar base 202 having a quadrilateral perimeter with opposite sides 204 and 206 being parallel and of equal length. Adjacent sides 204 and 206 are at right angles, and base 202 is formed of a thin, rigid sheet material. Retaining members 208 each have a transverse sectional configuration as described above in connection with either FIGS. 3 or 4, and the retaining members 208 are co-parallel to the opposite sides 204 of base 202. A plurality of long display members 210 and short display members 211 are removably retained by retaining members 208 due to flexible deformation of their end portions within longitudinal grooves of the retaining members. Display members 210 and 211 are preferably the miniature Venetian blind stock referred to above having a uniformly curved cross section and being made from a resilient thin sheet material. It will be recognized, however, that only the end portions of display members 210 and 211 are required to be thin and resilient and have a curved transverse sectional configuration. The preferred display members 210 and 211 also have a linear longitudinal sectional configuration, such that the two opposite long sides thereof are linear and abut the adjacent display members 210 and 211 on each side thereof. The short curved end portions of the display members are interfitted with the longitudinal grooves of retaining members 208, such that long sides of individual ones of the display members 210 and 211 are adjacent and parallel, and the curved end portions are flexibly deformed by the longitudinal grooves. FIG. 7 illustrates printed matter on display elements 210 and 211. Printed matter of varying heights can be accommodated by having the letters thereof spread over more than one row of display elements. It can be readily seen in FIG. 7 that changes in individual items, or in this example, their prices, can be readily accomplished by adding, removing or rearranging the display elements 210 or 211. Thus, for example, if an item is to be added to menu board 200, a new display element 210 with the information relating to the item is merely inserted into the group of display members 210. Similarly, a display member 211 can be substituted to change the price of an item. Alternatively, printed matter for some of the information can be permanently fixed to the display member while other information is provided by way of easily removable "stick-on" lettering. For example, the name of an item can be permanently printed on one end of a display member while removable lettering is used to show the price on the other end of the same display member.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A changeable sign assembly comprising:
   a planar base having a quadrilateral perimeter with opposite sides thereof being parallel and of equal length and adjacent sides thereof being at right angles, the base being formed of a thin, rigid sheet material;
   at least four longitudinal retaining members fixed to the base, the retaining members being coparallel to two opposite sides of the base perimeter;
   the said retaining members each being formed of an edge-rolled strip and having a transverse sectional configuration defined by a facing portion having a planar first side coplanar and in contact with a surface of the base, a web portion extending from a planar second side of the facing portion and having a curved concave side, and a wall portion extending from the web portion and having a planar inner side;
   the second side of the facing portion, the concave side of the web portion, and the inner side of the wall portion defining a longitudinal groove in each of said retaining members, the grooves being open in an opposing relationship to each other in opposing spaced-apart pairs of the retaining members, with intermediate pairs of the retaining members being adjacent one another with the grooves being closed in opposing relationship to each other;
   a plurality of elongate display members, each display member being formed of a thin, resilient sheet material and having a curved transverse sectional configuration and a linear longitudinal sectional configuration, such that two opposite long sides thereof are linear and two opposite short sides thereof are curved; and
   the short, curved sides of the display members being interfitted with the longitudinal grooves of the retaining members such that long sides of individual ones of the display members are adjacent and parallel, and the curved sides are flexibly deformed by the longitudinal grooves to removably retain the display members.

2. A changeable sign assembly comprising:
   a planar base having a quadrilateral perimeter with opposite sides thereof being parallel and of equal length and adjacent sides thereof being at right angles, the base being formed of a thin, rigid sheet material;
   at least three longitudinal retaining members fixed to the base in a spaced apart relationship, the retaining members being coparallel to two opposite sides of the base perimeter;
   the said retaining members each being formed from an extrusion and having a transverse sectional configuration defined by a planar facing portion having a planar first side coplanar and in contact with a surface of the base, a web portion extending from planar second and third sides of the facing portion and having a pair of curved concave sides, and a wall portion extending from the web portion and having a pair of planar inner sides opposite the second and third sides of the facing portion;
   the second side of the facing portion, one of the concave sides of the web portion, and one of the inner sides of the wall portion defining a first longitudinal groove in each of said retaining members, and the third side of the facing portion, the other one of the concave sides of the web portion, and the other one of the inner sides of the wall portion defining a second longitudinal groove in each of said retaining members, the grooves in opposing, space-apart pairs of the retaining members being open in an opposing relationship to each other;
   a plurality of elongate display members, each display member being formed of a thin, resilient sheet material and having a curved transverse sectional configuration and a linear longitudinal sectional configuration, such that two opposite long sides thereof are linear and two opposite short sides thereof are curved; and
   the short, curved sides of the display members being interfitted with the longitudinal grooves of the retaining members such that long sides of individual ones of the display members are adjacent and parallel, and the curved sides are flexibly deformed by the longitudinal grooves to removably retain the display members.

* * * * *